United States Patent
Hogger (12)

(10) Patent No.: US 6,490,262 B1
(45) Date of Patent: Dec. 3, 2002

(54) INTERFERENCE IN A CELLULAR COMMUNICATIONS SYSTEM

(75) Inventor: Robin George Hogger, Cork (IE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/442,371

(22) Filed: Nov. 17, 1999

(30) Foreign Application Priority Data

Jun. 1, 1999 (GB) .............................................. 9912532

(51) Int. Cl.$^7$ .............................................. H04B 7/212
(52) U.S. Cl. ........................ 370/337; 370/321; 370/347; 370/442; 370/478
(58) Field of Search .................................. 370/442, 347, 370/341, 337, 321, 319, 343, 436, 344, 478, 480, 330; 375/139, 131; 455/63, 67.1, 67.3

(56) References Cited

U.S. PATENT DOCUMENTS 5,570,352 A * 10/1996 Poyhonen .................... 370/330
5,581,548 A * 12/1996 Ugland et al. ............... 370/337

FOREIGN PATENT DOCUMENTS

| EP | 0439925 A2 | 8/1991 | | |
|---|---|---|---|---|
| GB | 2327176 A | 1/1999 | | |
| GB | 2332596 A | 6/1999 | | |
| GB | 2350750 A | * 12/2000 | ............ | H04B/1/713 |
| WO | WO93/17507 | 9/1993 | | |
| WO | WO 93/22850 | * 11/1993 | ............ | H04B/7/26 |

* cited by examiner

Primary Examiner—Dwayne Bost
Assistant Examiner—Sonny Trinh

(57) ABSTRACT

A method of, and apparatus for, processing interference in a cellular communications system. The method includes the steps of determining a quality value per burst; identifying those bursts for which the quality value is below a predetermined threshold; determining a pattern of the identified bursts in terms of transmission frequency and time; calculating respective predicted patterns based on respective hopping determination parameters of other cells and of the given cell; comparing the determined pattern of the identified bursts with the predicted patterns; and responsive thereto predicting the hopping determination parameters of whichever interfering cell produced the determined pattern of the identified bursts by interfering with the given cell. Further possibilities include comparing the given cell with the interfering cell and identifying predicted interfering timeslots. Further interference can be reduced by not transmitting bursts during some or all of the predicted interfering timeslots. Interference produced by overlapping parts of bursts of unsynchronised timeslots can be incorporated.

14 Claims, 1 Drawing Sheet

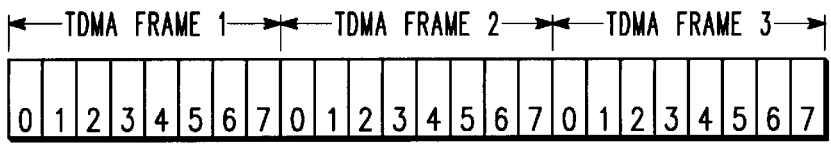
FIG. 1
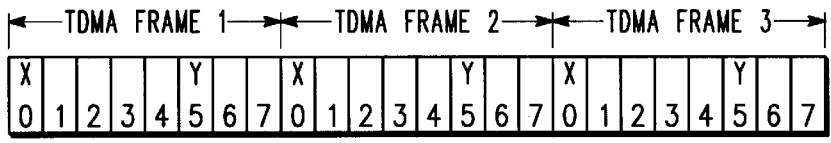
FIG. 2
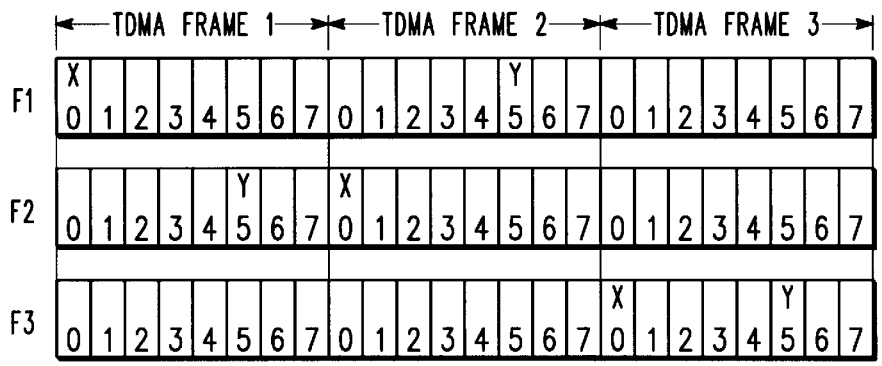
FIG. 3
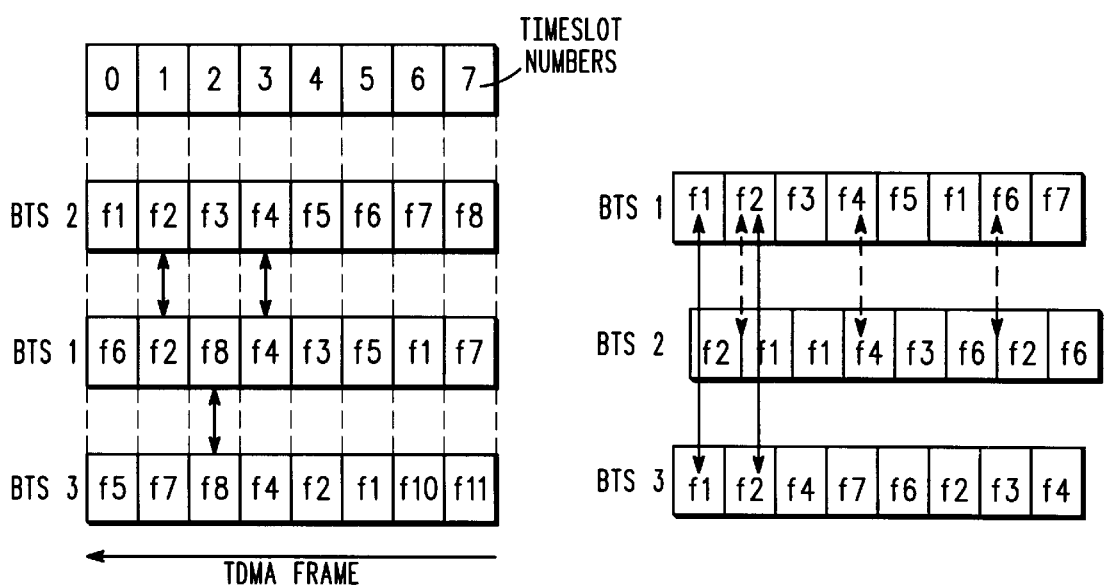
FIG. 4
FIG. 5

INTERFERENCE IN A CELLULAR COMMUNICATIONS SYSTEM

FIELD OF THE INVENTION

The present invention relates to interference in a cellular communications system which employs frequency hopping.

BACKGROUND OF THE INVENTION

One type of communications system is a cellular communications system. In a cellular communications system, the area over which service is provided is divided into a number of smaller areas called cells. Typically each cell is served from a base transceiver station (BTS) which has a corresponding antenna or antennas for transmission to and reception from a user station, normally a mobile station. Presently established cellular radio communications systems include GSM systems (Global System for Mobile Communications).

In a communications system, information is conveyed by means of a communications link which is divided into separate channels. In a digital cellular communications system, a plurality of channels occupy a single physical radio resource by virtue of a multiplexing technique called Time Division Multiple Access (TDMA). Time is divided into discrete periods called timeslots which are organised in time division frames, which are often called TDMA frames. In a GSM system each TDMA frame comprises the same number of timeslots, the number being 8. The timeslots are numbered sequentially. In GSM terminology, the timeslot numbers are 0 to 7 respectively. FIG. 1 shows timeslots numbered 0 to 7 arranged in 3 TDMA frames.

In a TDMA operated cellular communications system, the simplest way a channel is formed is by remaining on the same frequency band and allocating the same respective timeslot number of each consecutive time frame to that channel. This is shown in FIG. 2, where channel X is formed by repeatedly using timeslot number 0, and channel Y is formed by repeatedly using timeslot number 5. In the simple example of FIG. 2, all the TDMA frames shown are sent on the same RF carrier, i.e. at the same frequency.

In practical systems the number of cells means that frequency re-use is employed. In order to reduce interference in systems employing frequency re-use, it is known to employ frequency hopping. The same underlying basis of channel operation still applies when frequency hopping is being used, as will now be explained with reference to FIG. 3. In FIG. 3, three separate RF carrier frequencies are shown, namely F1, F2 and F3. Channel X is again formed by repeatedly using timeslot number 1 from consecutive TDMA frames, although now in this example such frames appear on different RF carriers according to a frequency hopping arrangement. Similarly, channel Y is again formed by repeatedly using timeslot number 5 from consecutive TDMA frames, with such frames appearing on different RF carriers according to the frequency hopping arrangement.

Within each timeslot a burst of one or more bits is transmitted and received.

Different BTSs will each carry out frequency hopping across their frequencies. The required hopping sequence for each subscriber unit, for example a mobile station (MS), is communicated to the MS as part of assignment signalling.

The frequency hopping arrangement or plan for a given BTS, or sector of a multi-sectored BTS, is determined by hopping determination parameters. For example, in the case of a GSM system, the frequency hopping arrangement is determined by a look-up table function defined in terms of (i) frame number (which is usually cycled, e.g. counted from 1 through to 4,000,000, say, and then started again from 1); (ii) hopping sequence number (an allocated number), and (iii) mobile allocation index offset (a predetermined offset).

Ideally, interference between different cells employing a same frequency or adjacent frequency due to frequency re-use would be entirely avoided by means of careful planning of the frequency re-use patterns and the frequency hopping arrangements selected. However, in practise, geographical factors, errors in planning, and changes to initial situations all lead to interference arising due to different cells transmitting on the same frequency, despite good intentions when planning the frequency re-use patterns. The effect on particular communications channels cannot be predetermined or resolved conventionally since each BTS can or will be operating with different values of hopping determination parameters, and moreover typically different BTSs will start their frame number count at different times so will be at different stages of their frame number count cycle.

SUMMARY OF THE INVENTION

The present invention addresses the problem of the above described interference.

According to one aspect of the present invention, there is provided a method of processing interference in a cellular communications system, as claimed in claim 1.

According to another aspect of the present invention, there is provided an apparatus for processing interference in a cellular communications system, as claimed in claim 8.

Further aspects of the invention are as claimed in the dependent claims.

The present invention advantageously provides a means for determining the effect of the hopping determination patterns of interfering cells.

Preferred versions of the present invention provide means for alleviating the interference.

Additional specific advantages are apparent from the following description and figures.

BRIEF DESCRIPTION OF THE DRAWINGS

FIG. 1 is an illustration of timeslots arranged in TDMA frames.

FIG. 2 is an illustration of channel allocation on a single frequency.

FIG. 3 is an illustration of channel allocation in a frequency hopping system.

FIG. 4 is an illustration of different frequencies employed for each timeslot for different BTSs.

FIG. 5 is another illustration of different frequencies employed for each timeslot for different BTSs.

DESCRIPTION OF AN EMBODIMENT OF THE INVENTION

One particular embodiment of the invention is now described by way of example only. The present embodiment relates to a GSM cellular communications system, whose TDMA timeslots, frames and frequency hopping of channels are arranged as described above with reference to FIGS. 1–3.

The method of processing interference in this cellular communications system according to the present embodiment will now be described, starting with the step of, for a given channel in a given cell of the communications system, determining a quality value per burst. In a GSM system the likelihood of being able to decode a given burst can be assessed from the values of the soft bits in the data portion of that burst. Soft bits refers to an estimated value given to respective time portions of the actual received signal level of what would theoretically be full signal (one) or zero. This concept is well understood by the skilled person. The number of good bits vs. bad bits in a burst as received at a BTS is quantified and the burst tied to a particular receive frequency in the hopping sequence (using the frame count and TN) so as to assess the quality of reception of that burst (or probability that the frame containing the burst will be erased) at that particular frequency. This is preferably carried out using an algorithm implemented in the form of software in a computer system located at the BTS of the given cell, tying in with that BTSs usual assessment of soft bit data from the relevant channel coder input. It is noted that the BTSs usual assessment of soft bit data conventionally leads merely to an indication of whether a whole frame can be considered good or bad data, whereas in the present embodiment of the present invention the data is used to delve deeper and determine the quality of individual bursts. Other means of implementation are possible, including for example by hardware or a mixture of hardware and software.

In the next step, a predetermined threshold, in terms of the level of consistency within a bit of its soft bits values, is set, and those bursts with a quality level below the threshold are identified. The level of the threshold will be set according to the requirements of the particular system under consideration. The higher the quality that is effectively demanded by the threshold, the more bursts will be identified requiring more processing as will be described below. Thus a typical trade-off situation is present which will be resolved by the skilled person according to usual considerations. Also, in other embodiments other indications of quality can be used. The format of the threshold required in such other embodiments will of course follow from the form of quality measure employed.

The identified bursts are then processed and arranged or plotted in a pattern, including a mathematical pattern or signature, by use of appropriate algorithms, in terms of whichever frequency that the burst had been transmitted on, and also in which timeslot of which frame number in the above described cycle of frame numbers of that BTS the burst was in. Thus the real pattern or signature of interference that has actually happened has been determined.

The form of the pattern of identified bursts subjected to interference will depend on what the source of the interference is, as shown schematically and in very simplified form in FIG. 4. FIG. 4 is simplified by considering only the given BTS plus two others, assuming that the given cell's BTS, namely BTS 1, is fully synchronised with BTS 2 and BTS 3, and also by only considering one channel per BTS. When fully synchronised, the timeslots fully line-up as shown by timeslot numbers 0 through 7. FIG. 4 shows for each BTS the different frequencies employed for each timeslot 0 through 7, as represented by f1, f2 and so on. The different frequency hopping arrangements between each BTS means that for the given cell, BTS 1, if interference occurs in timeslot number 1 on frequency f2, then in this simplified example it is due to BTS 2 because that has the same frequency at that time, likewise if interference occurs in timeslot number 2 on frequency f8, then it is due to BTS 3, whereas if interference occurs in timeslot number 3 on frequency f4 then this could be due to either BTS 2 or BTS 3, since both BTS 2 and BTS 3 employ f4 at that time.

As part of he process of working backwards to find out which sources have created the pattern that has been detected, the next step is carried out, namely that of calculating respective predicted patterns based on respective hopping determination parameters of other cells and of the given cell. In this step theoretical plots or patterns are produced by calculation, by calculating what interference patterns, in frequency and timeslot number domain, would occur were the transmissions of respective channels with respect to other BTSs destined to interfere. In other words, the frequency hopping arrangement of the given BTS is compared by a processor with that of a further BTS to see the occurrence of frequency overlap and at what timeslots these occur. In the present GSM example the frequency hopping arrangement is determined by a look-up table function defined in terms of the following hopping determination parameters: (i) frame number (which is usually cycled, e.g. counted from 1 through to 4,000,000, say, and then started again from 1); (ii) hopping sequence number (an allocated number), and (iii) mobile allocation index offset (a predetermined offset). In the case of synchronised BTSs in a perfectly operating system, the frame numbers would be the same, so only one pattern per frequency or channel need be calculated. However, in practise different BTSs are not synchronised with respect to each other, consequently the processing is preferably repeated for different possible values of frame number of the other BTS. The result is a set of predicted or theoretical interference patterns in frequency and timeslot domain, which is correspondingly produced for a number of BTSs that might feasibly interfered with the given BTS.

The next step is that of comparing the determined pattern of the identified bursts with the predicted patterns. This is preferably carried out by processing means, in the form of an algorithm implemented as software in a computer system located at the BTS. The choice of pattern recognition and processing algorithms, for matching, is made according to the requirements of the particular system under consideration, although preferably this is implemented by a neural network. One implementation is as follows.

Rank the likely cells (for this particular call) which are likely to be interferers in descending in order of the probability that they would interfere with the cell hosting the given call. The system can do this by using C/I (carrier to interferer ratio data) from mobile measurement report data (IOS) or RF planning data and deriving a ranking table for each cell.

Take the first ranked interfering cell and for each call that has been active on it during the time period that the errored bursts and frequencies from the wanted call (the signature) covers build a full pattern of bursts and frequencies (the interferers hopping sequence).

Take the wanted calls signature and overlay onto it the interfering calls hopping sequence exactly aligning the two calls frame structure. See if it is possible that this interferer (at this offset) could have caused the pattern of errored bursts (or a substantial portion thereof).

If this is the case the interfering call is the likely interferer. If not slide the interfering call hopping sequence over the interfered call by one bit period and repeat the comparison. Do this until a number of complete frames have been slipped (num_frames * 8 * 147 bits, where 8 is the number of timeslots (or bursts) in a frame, 147 is the number of bits in a normal burst, num_frames is the number of frames we need to search over to accommodate message delays etc. which mean we can't be exactly sure how the frame numbers on unsynchronised sites are lining up even though we can get a rough idea) to deal with the lack of synchronisation of the two sites. Note: This algorithm draws on a method of determining roughly what the relative offsets between frame numbers of the BTSs is. This is determined using messaging between the BTSs or up to the BSC.

Keep doing these comparisons until we have a number of calls that (in combination) produce an error pattern (like a mask) close to the pattern found on the wanted call. Note: When taking into account DTX and power control this gives us an advantage in that the expected errors will be absent for (relatively) long periods of time and then return for another long period of time which would be distinctive to a particular interfering call.

Over time the system will "learn" the timeslot offset of one site to another. The "learned" timeslot offset of one site to another could be used to discriminate interferers. If a call is always getting interference on the first 10 bits or last 137 bits of its burst it means we are looking for a site that has this offset from the site hosting the wanted call in its frame timing. A site that is 50% out of phase could not cause this pattern of errors. This would help narrow the field of potential interferers for the error pattern (interferer mask) construction.

When the above step of comparing the determined pattern of the identified bursts with the predicted patterns shows a theoretical pattern that appears to match the measured pattern that has actually happened, according to a desired level of statistical matching confidence, it is assumed that the interference occurring is in reality caused by the same characteristics as those input into the theoretical predicted pattern. In other words it can be assumed that the BTS and hopping pattern arrangement causing the interference is one providing the hopping determination parameters input into the matching calculation, thus such hopping determination parameters have been deduced and form the prediction of the hopping determination parameters of whichever interfering cell produced the determined pattern of the identified bursts by interfering with the given cell. The confidence level that can be ascribed to this prediction depends upon the degree of matching between the pattern of identified bursts and the predicted patterns.

Having determined which channel in another cell is causing interference on the given cell it can be predicted when (during which burst) the transmission frequencies of the two channels will next coincide. Thus in the present embodiment are implemented in one possible way the optional steps of comparing the hopping determination parameters of the given cell with the hopping determination parameters of the interfering cell; and identifying for which timeslots of the given channel the frequency of the interfering channel of the interfering cell and the frequency of the given channel of the given cell will coincide, such timeslots being considered predicted interfering timeslots.

For one or more such predicted interfering timeslots, no burst is transmitted. Such an action is hereinafter referred to as "Per Burst discontinuous transmission (DTX)". Per Burst DTX can be applied on the downlink for either or both of the two cells for this burst. When the channel on the interferer BTS is Burst DTXd the interferes mobile should experience an interference (error) free burst (this assumes that only one other channel is interfering with the interferee). This implements in one way in the present embodiment the optional step of reducing further interference by not transmitting bursts from the interfering cell on its interfering channel during some or all of the identified timeslots. However even if there is more than one channel causing interference the statistical likelihood of interference will be lowered.

In one way of implement the optional step of reducing further interference by not transmitting bursts from the given cell on the given channel during some or all of the identified timeslots, the interferes BTS is Burst DTXd (on the basis that the interfere e mobile would not be able to decode the burst anyway) the interferees contribution to interference on that frequency/burst combination is removed, statistically reducing the likelihood of interference in the network.

The possibility of multiple interfering channels is now considered. It is probable that multiple channels will interfere with the interfere e channels during the time window of a call on a channel. Burst DTXing all the bursts that would either be erased or cause bursts on other calls to be erased might mean that it would be certain that too few bursts were being received to be able to reconstruct a block (for example, in GSM the basic 260 bit/20 ms unit of a full rate traffic channel which is interleaved across 8 half bursts). The degree of interference on each burst is assessed according to numbers of bits that could not be decoded in the burst and the effect of the interference determined in terms of probability of frame erasure. This in combination with previous per burst assessments determines the cumulative effect of the measured interference on the current burst on the carried speech or data call. Thus the importance of decoding a particular received burst from the users perspective can be determined for the current burst and also predicted for future bursts. This indicates how imperative it is to transmit any given burst, current rule of thumb indicates that 3 bursts in 8 can be lost from any given call with no loss of data. The likelihood of interference can also be extrapolated to future bursts on this channel. Thus decisions can be made about which bursts to attempt sending and which to burst DTX. The decision to transmit (or not) is based on the number of previous bursts that have been burst DTXd and the cumulative affect on user perception of call quality, and the effect that DTXing this burst will have on decoding the frame to which it belongs. Thus are implemented the optional steps of assessing the probability of frame erasure should too many timeslots have no transmitted burst in them; and responsive thereto determining in which of the identified timeslots to transmit bursts.

Once an identification of the interfering channel(s) has been made the receive bursts that are predicted to coincide with the interfering bursts can be continually monitored to see when the interference "goes away", i.e. the interfering channel has stopped transmitting. At this point burst DTXing can be terminated. With respect to symmetry of uplink and downlink, in the scheme described the MS transmits and the BTS decodes (or vice versa). However there is no signalling scheme in GSM to allow the BTS to instruct the MS to DTX given bursts (or vice versa). There is also no scheme allowing the MS and BTS to communicate to each other the quality of reception on a per burst basis. However, if we assume that a given degree of interference on the uplink will correlate well to a degree of interference on the down link then the BTS can burst DTX downlink based on measured and predicted burst quality on the uplink and (potentially) vice versa. Thus are implemented in one possible way the optional steps of monitoring received bursts on the given channel of the given cell during the identified timeslots; and responsive thereto determining when the interfering channel of the interfering cell has ceased transmission.

Another consideration that can optionally be exploited relates to synchronisation. The network is only synchronised intra-BT'S and not inter-BTS. The frame number and timeslot do not provide an absolute timestamp but does provide relative timestamps (to other poor quality bursts on the same carrier/cell/BTS). This means that all timeslots with a given TN (timeslot number) and a given frame number are transmitted at the same time on a given BTS. However the transmission of timeslots on other BTSs will be unsynchronised with respect to the given BTS. The boundaries of timeslots on different BTSs will not be aligned and the frame numbers will be at a different point in their cycle. In practice this will mean that a given burst on will not usually be wholly interfered with by another call on another BTS. The degree of BER of a given burst will depend on the amount of overlap between the timeslots of the interferer and the interfere e. FIG. 5 shows for each BTS the different frequencies employed for each timeslot 0 through 7, as represented by f1, f2 and so on. In FIG. 5. it can be seen that timeslots on BTSs 1 & 3 are synchronised but BTS 2 is not synchronised with 1 & 3. So the 4th burst on BTS 1 will have the last 70% of its received bits interfered with by the first 70% of burst 4 on BTS 2. Similarly the first 30% of burst 7 on BTS 1 will be interfered with by the last 30% of burst 6 on BTS 2. By assessing quality values of parts of bursts, incorporating interference produced by overlapping parts of bursts of unsynchronised timeslots can be incorporated as a further detail in the characteristics compared between the determined pattern of the identified bursts and the predicted patterns. One way of assessing quality values of parts of bursts is to determine a separate quality values for the first half of the bits in a burst compared to the second half of the bits in a burst.

The present embodiment has been described in terms of a GSM system, but it should be appreciated that the present invention is applicable to any cellular communications system in which timeslots are arranged in some sort of time division frames and frequency re-use and hopping are employed. This means any cellular communications system in which pure time division frames, e.g. TDMA frames, are used, or any system in which hybrid versions of pure time division frames are used. An example of the latter is a combined TDMA/CDMA (where CDMA is code division multiple access) system.

I claim:

1. A method of processing interference in a cellular communications system, in which system transmission and reception is carried out using TDMA channels in which a burst of one or more bits is transmitted per timeslot; the method comprising the steps of:

carrying out frequency hopping on the TDMA channels of the system;

for a given channel in a given cell of the communications system, determining a quality value per burst;

identifying those bursts for which the quality value is below a predetermined threshold;

determining a pattern of the identified bursts in terms of transmission frequency and time;

calculating respective predicted patterns based on respective hopping determination parameters of other cells and of the given cell;

comparing the determined pattern of the identified bursts with the predicted patterns; and responsive thereto predicting the hopping determination parameters of whichever interfering cell produced the determined pattern of the identified bursts by interfering with the given cell.

2. A method according to claim 1, further comprising the steps of:

comparing the hopping determination parameters of the given cell with the hopping determination parameters of the interfering cell; and identifying for which timeslots of the given channel the frequency of the interfering channel of the interfering cell and the frequency of the given channel of the given cell will coincide thus constituting predicted interfering timeslots.

3. A method according to claim 2, further comprising the step of reducing further interference by not transmitting bursts from the given cell on the given channel during some or all of the predicted interfering timeslots.

4. A method according to claim 2, further comprising the step of reducing further interference by not transmitting bursts from the interfering cell on its interfering channel during some or all of the predicted interfering timeslots.

5. A method according to claim 3, further comprising the steps of:

assessing the probability of frame erasure should too many timeslots have no transmitted burst in them; and responsive thereto determining in which of the predicted interfering timeslots to transmit bursts.

6. A method according to claim 3, further comprising the steps of monitoring received bursts on the given channel of the given cell during the identified timeslots and/or predicted interfering timeslots; and responsive thereto determining when the interfering channel of the interfering cell has ceased transmission.

7. A method according to claim 1, further comprising the step of assessing quality values of parts of bursts, thereby incorporating interference produced by overlapping parts of bursts of unsynchronised timeslots.

8. An apparatus for processing interference in a cellular communications system, in which system transmission and reception is carried out using TDMA channels in which a burst of one or more bits is transmitted per timeslot;

the apparatus comprising:

means for carrying out frequency hopping on the TDMA channels of the system;

means for determining, for a given channel in a given cell of the communications system, a quality value per burst;

means for identifying those bursts for which the quality value is below a predetermined threshold;

means for determining a pattern of the identified bursts in terms of transmission frequency and time;

means for calculating respective predicted patterns based on respective hopping determination parameters of other cells and of the given cell;

means for comparing the determined pattern of the identified bursts with the predicted patterns; and means for responsive thereto predicting the hopping determination parameters of whichever interfering cell produced the determined pattern of the identified bursts by interfering with the given cell.

9. An apparatus according to claim 8, further comprising:

means for comparing the hopping determination parameters of the given cell with the hopping determination parameters of the interfering cell; and means for identifying for which timeslots of the given channel the frequency of the interfering channel of the interfering cell and the frequency of the given channel of the given cell will coincide thus constituting predicted interfering timeslots.

10. An apparatus according to claim 9, further comprising means for reducing further interference by not transmitting bursts from the given cell on the given channel during some or all of the predicted interfering timeslots.

11. An apparatus according to claim 9, further comprising means for reducing further interference by not transmitting bursts from the interfering cell on its interfering channel during some or all of the predicted interfering timeslots.

12. An apparatus according to claim 10, further comprising:
- means for assessing the probability of frame erasure should too many timeslots have no transmitted burst in them; and
- means for responsive thereto determining in which of the predicted interfering timeslots to transmit bursts.

13. An apparatus according to claim 10, further comprising:
- means for monitoring received bursts on the given channel of the given cell during the identified timeslots and/or predicted interfering timeslots; and
- means for responsive thereto determining when the interfering channel of the interfering cell has ceased transmission.

14. An apparatus according to claim 8, further comprising means for assessing quality values of parts of bursts, thereby incorporating interference produced by overlapping parts of bursts of unsynchronised timeslots.

* * * * *